(12) United States Patent
Buvat et al.

(10) Patent No.: US 10,418,644 B2
(45) Date of Patent: Sep. 17, 2019

(54) METHOD FOR MANUFACTURING A COMPOSITE BIPOLAR PLATE, COMPOSITE BIPOLAR PLATE, USES THEREOF AND FUEL CELL COMPRISING SUCH A COMPOSITE BIPOLAR PLATE

(71) Applicant: COMMISSARIAT A L'ENERGIE ATOMIQUE ET AUX ENERGIES ALTERNATIVES, Paris (FR)

(72) Inventors: Pierrick Buvat, Montbazon (FR); Philippe Toneguzzo, Tours (FR); Sebastien Dagaz, Les Echelles (FR); Brice Page, Artannes sur Indre (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 326 days.

(21) Appl. No.: 15/312,942

(22) PCT Filed: May 27, 2015

(86) PCT No.: PCT/EP2015/061716
§ 371 (c)(1),
(2) Date: Nov. 21, 2016

(87) PCT Pub. No.: WO2015/181238
PCT Pub. Date: Dec. 3, 2015

(65) Prior Publication Data
US 2017/0200958 A1    Jul. 13, 2017

(30) Foreign Application Priority Data
May 27, 2014 (FR) ..................... 14 54768

(51) Int. Cl.
| | |
|---|---|
| *H01M 8/0213* | (2016.01) |
| *H01M 8/0226* | (2016.01) |
| *H01M 8/1011* | (2016.01) |
| *H01M 8/0221* | (2016.01) |
| *B28B 3/02* | (2006.01) |
| *B28B 7/42* | (2006.01) |
| *H01M 8/1018* | (2016.01) |
| *H01M 8/0202* | (2016.01) |
| *H01M 8/1041* | (2016.01) |
| *B29C 43/52* | (2006.01) |
| *H01M 8/0204* | (2016.01) |

(52) U.S. Cl.
CPC .......... *H01M 8/0226* (2013.01); *B28B 3/025* (2013.01); *B28B 7/42* (2013.01); *H01M 8/0213* (2013.01); *H01M 8/0221* (2013.01); *H01M 8/1011* (2013.01); *B29C 43/52* (2013.01); *H01M 8/0202* (2013.01); *H01M 8/0204* (2013.01); *H01M 8/1018* (2013.01); *H01M 8/1041* (2013.01); *H01M 2008/1095* (2013.01); *Y02E 60/521* (2013.01); *Y02E 60/523* (2013.01); *Y02P 70/56* (2015.11)

(58) Field of Classification Search
CPC ............ H01M 8/0202; H01M 8/0204; H01M 8/0213; H01M 8/0221; H01M 8/0226; H01M 8/1011; H01M 8/1018; H01M 8/1041; H01M 2008/1095; Y02E 60/521; Y02E 60/523; B29C 43/53; B29C 43/52
USPC ....................................................... 264/403
See application file for complete search history.

(56) References Cited

U.S. PATENT DOCUMENTS

| | | | |
|---|---|---|---|
| 7,494,740 B2 * | 2/2009 | Bonnet | H01M 8/0213 252/511 |
| 2002/0180088 A1 | 12/2002 | Hashiguchi et al. | |
| 2003/0027030 A1 | 2/2003 | Kawashima et al. | |
| 2009/0305111 A1 * | 12/2009 | Arai | H01M 8/0221 429/514 |
| 2010/0219551 A1 | 9/2010 | Arai et al. | |
| 2012/0038079 A1 * | 2/2012 | Perrier | H01B 1/24 264/105 |

(Continued)

FOREIGN PATENT DOCUMENTS

| | | |
|---|---|---|
| EP | 1 248 311 A2 | 10/2002 |
| EP | 1 750 320 A1 | 2/2007 |

(Continued)

OTHER PUBLICATIONS

"KYNAR.RTM. PVDF Performance Characteristics and Data", https://www.fosterpolymers.com/downloads/docs/general/Kynar%20PVDF%20Performance%20Characteristics%20&%20Data.pdf, downloaded Dec. 5, 2018. (Year: 2018).*

(Continued)

*Primary Examiner* — Joseph S Del Sole
*Assistant Examiner* — Lawrence D. Hohenbrink, Jr.
(74) *Attorney, Agent, or Firm* — Oblon, McClelland, Maier & Neustadt, L.L.P.

(57) ABSTRACT

A method for manufacturing a composite bipolar plate from a composition including at least one lamellar graphite and at least one thermoplastic polymer. This method includes dry sieving of the composition with a sieve for which the mesh diameter is less than or equal to 1,000 μm, dry blending of the sieved composition, deposition of the blended composition in a mold, this mold preferably being pre-heated, molding by thermocompression of the blended composition with induction heating of the mold, and removal from the mold of the thermocompressed composition leading to the obtaining of the composite bipolar plate. A composite bipolar plate manufactured by this method, to the use of this composite bipolar plate as well as to a fuel cell including such a composite bipolar plate.

22 Claims, 2 Drawing Sheets

(56) References Cited

U.S. PATENT DOCUMENTS

2014/0087287 A1    3/2014    Suzuki et al.

FOREIGN PATENT DOCUMENTS

EP         2 717 369 A1    4/2014
JP         2006-294407 A   10/2006

OTHER PUBLICATIONS

International Search Report dated Sep. 2, 2015 in PCT/EP2015/061716 filed May 27, 2015.
French Search Report dated Jan. 23, 2015 in FR 14 54768 filed May 27, 2014.

* cited by examiner

METHOD FOR MANUFACTURING A COMPOSITE BIPOLAR PLATE, COMPOSITE BIPOLAR PLATE, USES THEREOF AND FUEL CELL COMPRISING SUCH A COMPOSITE BIPOLAR PLATE

TECHNICAL FIELD

The present invention relates to the field of fuel cells and notably that of fuel cells with a proton exchange membrane, also known under the terminology of fuel cells with a polymer electrolyte membrane (proton exchange membrane fuel cells or Polymer Electrolyte Membrane Fuel Cells and abbreviated as PEMFC). Among the cells of the PEMFC type, mention may be made of Direct Methanol Fuel Cells (acronym DMFC).

These PEMFC and DMFC fuel cells are formed with a stack of elementary electrochemical cells, also-called membrane electrode assemblies abbreviated as MEAs. These elementary electrochemical cells or MEAs are formed with an anode, a cathode and an electrolyte membrane positioned between said anode and cathode, this electrolyte membrane conducting the protons.

Elementary electrochemical cells or MEAs are separated from each other with bipolar plates. Such bipolar plates may be made in metal, in graphite or further in a composite material, i.e. in a material obtained from a composition comprising graphite and a thermoplastic or thermosetting polymer. When the bipolar plate is made in such a composite material, this is then referred to as « composite bipolar plate ».

The invention more particularly relates to a method for manufacturing a composite bipolar plate, such a composite bipolar plate being intended to enter the structure of fuel cells and, notably, of fuel cells of the PEMFC and DMFC type.

STATE OF THE PRIOR ART

Fuel cells of the PEMFC type are devices which produce electricity and heat simultaneously, by electrochemical reactions between the protons $H^+$ from the oxidation of dihydrogen $H_2$ at the anode which, after having migrated through the proton exchange electrolyte membrane, will react with the dioxygen $O_2$ at the cathode.

As indicated earlier, such fuel cells are formed with a stack of elementary electrochemical cells or MEAs, separated from each other with bipolar plates.

These bipolar plates have several functions.

The first function of these bipolar plates is to supply the fuel cell with gas fuel (dihydrogen $H_2$ or methanol in the case of a cell of the DMFC type) and with oxidizing gas (dioxygen $O_2$, either pure or present in air) but also to discharge the reaction products generated by the electrochemical reactions occurring inside the MEAs of the fuel cell, such as water, heat and non-consumed gases. The bipolar plates have also to be cooled and therefore further comprise a circulation of a heat transfer fluid, such as a coolant liquid.

In order to ensure this first function, the bipolar plates, which conventionally appear as parts with a parallelepipedal shape and with a thickness of few millimeters (typically comprised between 0.2 mm and 6.0 mm), comprise, on each of their faces, networks of channels which allow the distribution of the fuel and oxidizing gases, the circulation of the coolant fluid as well as the discharge of non-consumed gases and of the reaction products generated by the electrochemical reactions implemented.

In addition to allowing the transit, the circulation and the discharge of the various fluids, the bipolar plates ensure a second function of a mechanical nature. Indeed, the bipolar plates have to have sufficient mechanical characteristics for allowing the juxtaposition of a large number of MEAs, their maintaining, notably by compression between both end plates, as well as the cohesion of the assembly which they form with these MEAs.

Moreover, the bipolar plates still have a third function of ensuring electric conduction between the anode and the cathode of each of the adjacent MEAs and of collecting the electric current produced during the electrochemical reactions.

Thus, in order to ensure these various functions of circulation of the fluids, of mechanical cohesion and of electric conduction, the bipolar plates notably and cumulatively have to have good planar electric conductivity, be impervious to various fluids which circulate therein as well as have chemical stability towards these different fluids, gases and other liquids, such as water and/or the liquid coolant. As an example, good planar electric conductivity means that the latter is greater than or equal to 70 S/cm, advantageously greater than or equal to 80 S/cm and, preferentially, greater than or equal to 100 S/cm.

As mentioned earlier, the bipolar plates may be made in metal, graphite or further in a composite material.

The metal bipolar plates, generally in stainless steel, are satisfactory in terms of mechanical strength and of planar electric conductivity. However, their chemical resistance remains insufficient. Thus, overtime, the formation of a resistive surface layer to the surface of the metal bipolar plates as well as the salting out of metal ions which will perturb the operation of the electrolyte membrane of the MEAs are observed. In order to find a remedy to these major drawbacks, it is possible to proceed with the deposition, on the external faces of the metal bipolar plates, of a conductive protective layer, for example in carbon or in a precious metal, which is not without any incidence on the overall cost of the method for manufacturing such thereby coated composite bipolar plates.

If the bipolar plates are made in graphite, they have, as for them, good resistance to corrosion as well as a good planar electric conductivity, they however remain fragile and have a prohibitive manufacturing cost related to the machining of the networks of distribution channels, circulation channels and discharge channels of the different fluids involved in a fuel cell.

The composite bipolar plates, which have good mechanical properties, are made from compositions comprising a strong mass percentage of at least one electrically conducting filler and a polymer which may be a thermoplastic polymer or a thermosetting polymer. The manufacturing methods for such composite bipolar plates conventionally comprise a step for transforming by injection, which has the advantage of allowing high production rates, or by thermocompression. In the case of a transformation step by thermocompression, the composition is introduced into a mould advantageously provided with an imprint printing, at said composite bipolar plates, the networks of distribution, circulation and discharge channels of the different fluids.

The electrically conductive fillers give the composite bipolar plates good planar electric conductivity while the thermoplastic or thermosetting polymer provides chemical stability towards the fluids implied in fuel cells and participates in the good mechanical strength of the composite bipolar plates.

However, if it is found that the increase of the mass percentage of electrically conductive fillers improves the electric conductivity properties including those of planar electric conductivity, it is observed that this improvement is made to the detriment of mechanical properties and to gas proof properties of the composite bipolar plates manufactured from said compositions. Further, only a manufacturing method applying a transformation step by thermocompression remains conceivable since, beyond a certain mass percentage of electrically conductive fillers, the transformation by injection becomes impossible because of the strong increase in the viscosity of the composition depending on the increase of said mass percentage.

Document U.S. Pat. No. 7,494,740, referenced as [1] at the end of the present description, describes a method for manufacturing a composite bipolar plate, by extrusion or by injection, of a micro-composite power based on graphite platelets and on a fluoropolymer. Although the injection of such a micro-composite powder, notably at 240° C. in an injection press with a screw having a profile of the PVC type, is described in document [1], experience shows that the injection, which is a transformation method having the advantage of ensuring a higher manufacturing rate than extrusion, is not conceivable industrially.

This micro-composite powder comprises:
graphite platelets, noted as $G_{LP}$, with a side from 50 μm to 1,000 μm and with a thickness from 5 μm to 50 μm, consisting of more elementary graphite particles agglomerates placed side by side and superposed so that their main planes are parallel with each other, these graphite platelets $G_{LP}$ being further covered with particles of 0.1 μm to 0.5 μm of a fluoropolymer.

These agglomerated more elementary graphite particles consist of elementary platelets of expanded graphite with a side from 5 μm to 20 μm and a thickness from 0.1 μm to 5 μm.

The micro-composite powder described in document [1] may further comprise natural or synthetic graphite in a lamellar form, noted as G1, having a particles size comprised between 10 μm and 600 μm, this graphite G1 being covered with particles from 0.1 μm to 0.5 μm of a fluoropolymer.

Advantageously, the micro-composite powder described in document [1] comprises a mass percentage from 10% to 40% of fluoropolymer for a mass percentage from 60% to 90% of graphite platelets $G_{LP}$ and, if necessary, graphite in a lamellar form G1.

The method for manufacturing a composite bipolar plate described in document [1] produces a mixture formed by an aqueous dispersion comprising graphite platelets with dimensional characteristics from 100 μm to 1,000 μm with particles having an average side of 300 μm, a second graphite with dimensional characteristics from 10 μm to 80 μm on the side with an average of 30 μm, an emulsion of polyvinylidene fluoride (PVDF), an anti-foam agent and a surfactant, a mixture which is then pumped and then co-atomized as a powder. This powder is then pressed at 1 T/cm² and at 185° C. in order to form a composite bipolar plate.

Document [1] specifies that the composite bipolar plates obtained have a high surface conductivity, notably of 50 S/cm and of 130 S/cm, as well as transverse and longitudinal heat conductivities, respectively comprised between 2 W/m·K and 50 W/m·K, on the one hand, and between 10 W/m·K and 200 W/m·K, on the other hand. Further, this document [1] adds that such plates may be highly impervious or, on the contrary, porous depending on the implementation conditions. However, this document does not give any specification as to such implementation conditions, except for the addition of a pore-forming agent in the micro-composite powder. Incidentally, nothing in document [1] indicates that, in the absence of such a pore-forming agent, a composite bipolar plate which is obtained has satisfactory imperviousness to gases.

Moreover, experience shows that the anti-foam agent implemented in the method for manufacturing a composite bipolar plate described in document [1] causes a drop in the performances of these plates when these plates are used in a fuel cell. Indeed, during the operation of a fuel cell comprising composite bipolar plates according to the teaching of document [1], an exudation phenomenon of this anti-foam agent occurs. This exudation phenomenon generates a notable modification of the properties of these composite bipolar plates which, becoming very hydrophilic, prove to be incapable of ensuring the circulation and the discharge of certain fluids such as aqueous fluids and, in particular, the water generated by the electrochemical reactions. In other words, the residual presence of the anti-foam agent used in the manufacturing method as taught in document [1] causes "a flooding" of the fuel cell.

The object of the present invention is therefore to find a remedy to the drawbacks exhibited by the method described in document [1] and to propose a method which gives the possibility, from a composition comprising at least one electrically conductive filler and a polymer, of manufacturing a composite bipolar plate simultaneously having the whole of the following features:
a high planar electric conductivity, typically greater than or equal to 70 S/cm, advantageously greater than or equal to 80 S/cm and, preferentially, greater than or equal to 100 S/cm, directly related to a mass percentage of electrically conductive fillers which should be at least 70% based on the total mass of the composition,
very good imperviousness to gases and, in particular, to dihydrogen and to dioxygen, it being specified that this imperviousness to gases is evaluated with reference to a rejection rate at the gas imperviousness test which will be detailed hereafter, this method moreover giving the possibility of manufacturing said composite bipolar plates with a productivity perfectly compatible with industrial production and notably with a manufacturing cycle time less than that of the manufacturing method by extrusion described in document [1], this manufacturing cycle time being advantageously less than 5 minutes.

This method according to the invention should further give the possibility of manufacturing a composite bipolar plate which may be implemented in a fuel cell, without any risk of flooding this fuel cell.

DISCUSSION OF THE INVENTION

The object, as well as other ones, are attained, firstly by a method for manufacturing a composite bipolar plate from a composition of the aforementioned type, i.e. comprising at least one electrically conductive filler and a polymer.

According to the invention, the method for manufacturing a composite bipolar plate is achieved from a composition comprising at least one lamellar graphite and at least one thermoplastic polymer, and comprising the following successive steps:

(a) dry sieving of the composition by means of a sieve for which the mesh diameter is less than or equal to 1,000 µm,
(b) dry blending of the sieved composition,
(c) deposition of the blended composition in a mold, this mold preferably having been pre-heated,
(d) molding by thermocompression of the composition with induction heating of the mold, and
(e) removal from the mold of the thermocompressed composition leading to obtaining the composite bipolar plate.

The inventors have observed that, unexpectedly and surprisingly, the combination of the homogenization steps (a) and (b) and of molding by thermocompression with induction heating (d) gives the possibility of manufacturing a composite bipolar plate which is characterized by the absence of open porosity, thereby promoting the composite bipolar plate to be sealed to gases like dihydrogen and dioxygen, and, more generally, to fluids which are intended to circulate in the channel networks of this composite polar plate.

Further, it is observed that the method according to the invention also gives the possibility of manufacturing a composite bipolar plate which has a homogenous and regular distribution of lamellar graphite in the whole thickness of the composite bipolar plate, in the absence of formation of a resistive surface layer of thermoplastic polymer provided by the diffusion of said thermoplastic polymer as this occurs during a molding step by conventional thermocompression during which the heating of the mold is ensured by convection or by conduction. This homogenous and regular distribution is observable at a submillimetric scale, i.e. at a scale of less than one millimeter and typically at a scale of the order of 100 µm. By means of the method according to the invention, the obtained composite bipolar plate is provided with excellent planar electric conductivity, typically greater than or equal to 80 S/cm, or even greater than or equal to 100 S/cm, in the absence of any additional step aimed at removing this resistive surface layer, for example by abrasion or further by machining. The composite bipolar plate as obtained by the manufacturing method according to the invention is further provided with excellent transverse electric conductivity, typically greater than or equal to 15 S/cm, as well as excellent transverse heat conductivity, typically greater than or equal to 12 W/m·K. Such a composite bipolar plate is therefore in every point compliant with the requirements of the Department of Energy (DOE) of the United States.

The method according to the invention therefore gives the possibility of manufacturing composite bipolar plates of excellent quality, with a productivity greater than that of present methods and, notably, with a productivity which cannot be attained with the manufacturing method by extrusion described in document [1], making the method according to the invention very interesting from the point of view of industrial production.

The composition at least comprises one specific lamellar graphite and at least one thermoplastic polymer, each of these compounds appearing as a powder.

Before proceeding with the sieving step (a) for the composition, it is quite conceivable to proceed with a first blending, or pre-blending, of powders of lamellar graphite and of thermoplastic polymer.

Such a pre-blend may be carried out manually or by means of a powder blender of the Turbula® type. However, it is specified that manual pre-blending is sufficient for optimizing the time for obtaining the blended composition to be deposited in the mold. As an example, manual pre-blending with a period of 1 min gives the possibility of a gain in time of 20 mins for obtaining such a blended composition.

The dry sieving step (a) of the composition may be carried out by means of a sieve which may be automatic and which may advantageously be equipped with an unclogging device, such a device allowing gradual removal of the powders which would be clogged on the sieve during the dry sieving step (a). An automatic sieve may notably and advantageously be used, equipped with an unclogging device of the Ro-Tap® type.

In an advantageous alternative of the method according to the invention, the mesh diameter of the sieve used in step (a) is selected so as to be of the same order, or even slightly greater, than the average particles size as exhibited by at least 90% of the particles by number of the compounds present in the composition.

It is specified that this average particles size exhibited by at least 90% of the particles by number is subsequently noted as « $d_{90}$> » in the present application.

This mesh diameter of said sieve implemented during step (a) may, in particular, be comprised between 100 µm and 600 µm, advantageously between 200 µm and 500 µm and, preferentially, between 250 µm and 400 µm.

It is also specified that the expression « comprised between . . . and . . . » which has just been mentioned and which is used in the present application should be understood as not only defining the values of the interval but also the values of the limits of this interval.

Indeed, it is observed that the application of such advantageous and preferred intervals for the mesh diameter of the sieve gives the possibility of further improving the homogeneity of the blended composition obtained at the end of the blending step (b) and, therefore, the properties of the composite bipolar plate as obtained at the end of the manufacturing method according to the invention, as this will be seen hereafter.

In a particular embodiment of the method according to the invention, the dry blending step (b) of the sieved composition is carried out by means of a convective powder blender of the Turbula® type.

The homogeneity of the composition obtained at the end of this dry blending step (b) increases with the duration of this step (b).

The dry sieving step (a) and dry blending step (b) of the composition comprising the lamellar graphite and the thermoplastic polymer give the possibility of obtaining a composition appearing as a homogenous blend of the different powders forming the composition, although the powders of lamellar graphite and of thermoplastic polymer generally differ by their grain sizes, their densities and their particles shapes. These steps (a) and (b) give the possibility of obtaining a homogenous blend and this even in the case when the thermoplastic polymer is electrostatic.

At the end of the dry blending step (b) of the lamellar graphite and thermoplastic polymer powders, it is proceeded with step (c) of deposition of the composition as obtained, designated subsequently in the present application by the expression « blended composition », in a mold in which the molding step (d) by thermocompression is then carried out.

This mold comprises an imprint which determines the final shape of the composite bipolar plate. Thus, the composite bipolar plate as obtained at the end of the manufacturing method according to the invention may comprise, on each of its faces, the networks of distribution channels, circulation channels and discharge channels for the different fluids involved in a fuel cell, notably the networks which conventionally appear as coils, without it being necessary to proceed with an additional machining step. However, nothing prevents such a subsequent machining step.

Conventionally, the mold consists of a matrix, or a female portion, in which is deposited the blended composition, and a punch, or male portion, which gives the possibility of closing the mold.

In an advantageous embodiment of the method according to the invention, this mold is heated prior to the implementation of step (c) of depositing the blended composition in said mold. In a more particularly advantageous way, the mold is pre-heated by means of an induction heating in order to shorten the time required for heating this mold.

The step (c) of deposition of the blended composition may be carried out by manually pouring this composition into the imprint of the mold but also by automatic pouring. As an example of an application, it is possible to proceed with the taking of the blended composition amount to be deposited by means of an automatic metering device, and then with the depositing this amount by means of a vibrating system moving above the imprint of the mold. The deposition of the blended composition in the imprint of the mold may also be performed in one or several passes.

Regardless of the retained pouring conditions, it is recommended that this step (c) leads to regular distribution of the blended composition in the imprint of the mold.

After closing the mold, it is preceded with the molding step (d) by thermocompression by means of induction heating of the mold. This step (d) may notably be carried out by means of the technology designated under the terminology "3iTech®" and developed by the Roctool company.

This molding step (d) by thermocompression is advantageously carried out by applying a pressure comprised between $5.10^7$ Pa and $15.10^7$ Pa, the mold being moreover preferably heated to a temperature above the melting temperature of the thermoplastic polymer present in the blended composition.

Preferably, during this step (d), the applied pressure is comprised between $7.10^7$ Pa and $10.10^7$ Pa.

As indicated earlier, the composition comprises at least one lamellar graphite and at least one thermoplastic polymer. Therefore, it may only consist of a single lamellar graphite and of a single thermoplastic polymer. It may also comprise one or more lamellar graphites and/or one or more thermoplastic polymers.

In an alternative of the invention, the mass percentage of the lamellar graphite(s) represents the majority mass percentage of the composition from which is manufactured the composite bipolar plate.

In a particular alternative, the composition comprises, the mass percentages being based on the total mass of the composition:
  at least 70% of said at least one lamellar graphite, and
  at least 10% of said at least one thermoplastic polymer.

In the foregoing and in the following, by "lamellar graphite" is meant a graphite appearing in the form of individual lamellas and not as agglomerates of lamellas, as exhibited by the graphite platelets $G_{LP}$ of document [1].

It is specified that the expressions such as «graphite in lamellas», «graphite lamellas» and «graphite platelets» are to be considered as synonyms of that of «lamellar graphite».

The lamellar graphite may be a synthetic lamellar graphite, i.e. a lamellar graphite which is obtained by synthesis, or else a natural lamellar graphite.

A synthetic lamellar graphite being however a graphite of great purity, it will be thus preferred to natural lamellar graphite.

Graphite as described and noted as G1 in document [1] may notably be used as a lamellar graphite in the sense of the present invention.

The elementary platelets of expanded graphite, which in an agglomerated form make up the graphite platelets $G_{LP}$ of document [1], may also be used as such, i.e. in a customized form, like lamellar graphite in the sense of the present invention.

According to a particular embodiment of the invention, each lamellar graphite appears in the form of particles for which at least 90% in number have an average particles size $d_{90}$ comprised between 1 µm to 300 µm, advantageously between 5 µm and 200 µm and, preferably, between 10 µm and 180 µm.

In particular, it is possible to apply the synthetic lamellar graphites designated by the name of «primary synthetic graphites» and marketed by the Timcal company under the trade name Timrex® KS Graphite. As this will be seen in the examples hereafter, the synthetic lamellar graphites bearing the trade reference names Timrex® KS75 and Timrex® KS150 were used.

According to a particular embodiment of the invention, the mass percentage of lamellar graphite(s) is comprised between 75% and 90%, advantageously between 80% and 88% and, preferably, between 82% and 86%, based on the total mass of the composition.

The composition further comprises at least one thermoplastic polymer.

In a particularly advantageous version of the invention, each lamellar graphite and each thermoplastic polymer appear as particles for which the average sizes of particles $d_{90}$ are of the same order. It should of course be understood that the particles of lamellar graphite correspond to the lamellas of this graphite. Thus, each lamellar graphite and each thermoplastic polymer appear in the form of particles for which at least 90% in number have an average particles size $d_{90}$ comprised in the same interval, preferably comprised between 1 µm and 300 µm.

In such a preferential version of the invention, and notably at the end of step (b) of dry blending of the composition, one is in presence of a particularly homogenous blended composition formed by the particles of each of the lamellar graphites and of the thermoplastic polymers. This particular homogeneity of the blended composition has direct incidence on the properties of the composite bipolar plate as obtained at the end of step (e) of the method according to the invention.

Indeed, the higher the homogeneity of the blended composition, the more the composite bipolar plate obtained by the method according to the invention has a particularly low porosity level and, consequently, a heat conductivity as well as a resistance to the gas imperviousness test clearly improved. Further, the composite bipolar plate, for which the visual aspect is quite satisfactory, has a particularly smooth and regular surface which exactly reproduces the imprint left by the mold and does not require any additional machining step.

Such a homogeneity cannot by any means be attained by the manufacturing method as described in document [1] which implements a micro-composite powder formed with graphite(s) particles partly covered with fluoropolymer particles which have a size much less than that of said graphite(s) particles.

According to a particular embodiment of the invention, each thermoplastic polymer appears as particles for which at least 90% in number have an average particles size $d_{90}$ comprised between 1 µm and 200 µm, advantageously between 2 µm and 100 µm and preferably between 3 µm and 50 µm.

According to a particular embodiment of the invention, each thermoplastic polymer is advantageously selected from among a polyolefin, a fluoropolymer and a poly(phenylene sulfide) (PPS).

Preferably, this thermoplastic polymer is a fluoropolymer.

This fluoropolymer may be a homopolymer of vinylidene fluoride (VDF, also noted as VF2), i.e. a polyvinylidene fluoride (PVDF).

This fluoropolymer may also be a copolymer of vinylidene fluoride (VDF) and of at least one other fluorinated co-monomer which may be co-polymerized with VDF. This at least one other fluorinated co-polymer may, for example, be selected from the fluorinated co-polymers mentioned in document [1], at lines 40 to 58 of column 7. This other co-monomer may notably be selected from among:

vinyl fluoride,
trifluoroethylene (TFE or VF3),
chlorotrifluoroethylene (CTFE),
1,2-difluoroethylene,
hexafluoropropylene (HFP), and
perfluoro(alkylvinyl) ethers.

In an advantageous alternative of the invention, the fluoropolymer is a polyvinylidene fluoride (PVDF) or a poly (vinylidene fluoride-hexafluoropropylene) (PVDF-HFP).

According to a particular embodiment of the invention, the mass percentage of thermoplastic polymer(s) is comprised between 11% and 25%, advantageously between 12% and 20% and, preferably, between 14% and 18%, based on the total mass of the composition.

According to an embodiment of the invention, the composition further comprises at least one additive.

In an advantageous version of the method according to the invention, this additive is an electrically conductive additive and preferably a non-metal electrically conductive additive. Indeed, when this additive is non-metal, it has the advantage of giving to the composite bipolar plate manufactured from a composition comprising it, an increased corrosion resistance under the conditions of use of fuel cells of the PEMFC type, i.e. an operating temperature of the order of 80° C., in an oxidizing environment, in the presence of slightly acid water.

In a preferred version of the method according to the invention, the electrically conductive additive is selected from expanded graphite, graphite in the form of lamellas or platelets, carbon black, active coal, carbon fibers, carbon nanotubes and mixtures thereof, provided that the graphite in the form of lamellas or platelets has dimensions other than those of the specific lamellar graphite of the composition implemented in the method according to the invention.

The graphite platelets, as described and noted as $G_{LP}$ in document [1], may notably be used as an electrically conductive additive.

More preferentially, the electrically conductive additive is an expanded graphite. In the examples hereafter, the expanded graphite available from the Timcal company and bearing the trademark reference Timrex® BNB90 was used.

According to an embodiment of the invention, the mass percentage of additive(s) may represent up to 10% of the total mass of the composition.

According to a particular embodiment of the invention, this mass percentage of additive(s) is advantageously comprised between 2% and 5% and, preferably, between 3% and 4%, based on the total mass of the composition.

Figure 3:
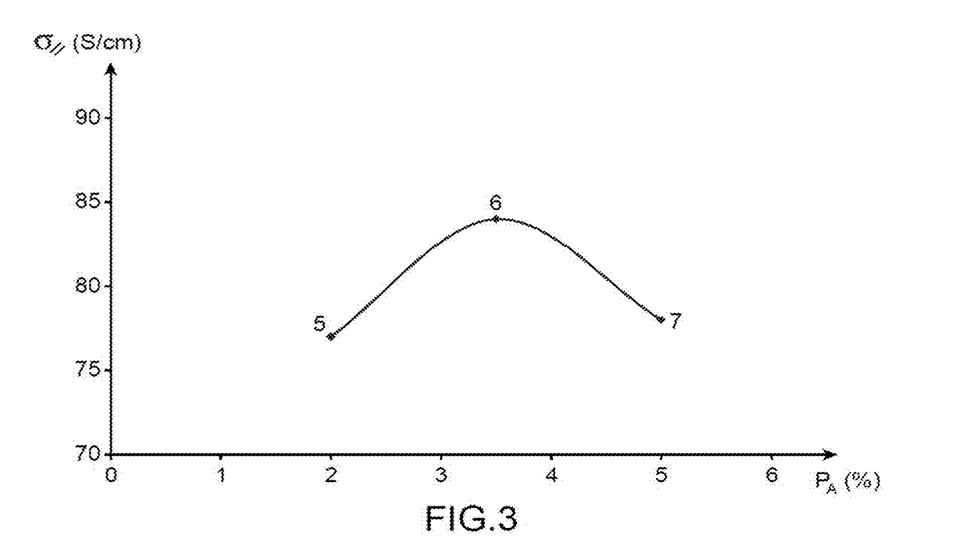
FIG. 3 illustrates the time-dependent change in the planar electric conductivity (noted as $\sigma_{//}$ and expressed in S/cm) of the bipolar plates manufactured from compositions 5 to 7, depending on the mass percentage of additive (noted as $P_A$ and expressed in %) present in said compositions 5 to 7.

The exemplary embodiments described hereafter, in connection with FIG. 3, demonstrate unexpectedly and surprisingly that a composition comprising, in addition to the thermoplastic polymer and to the lamellar graphite, a mass percentage of expanded graphite comprised between 3% and 4%, gives remarkable planar electric conductivity.

The invention secondly relates to a composite bipolar plate.

According to the invention, this composite bipolar plate is manufactured by implementing the method which has just been defined above.

More particularly, this composite bipolar plate is made from a composition comprising at least one lamellar graphite and at least one thermoplastic polymer by the method comprising the following successive steps:

(a) dry sieving of the composition by means of a sieve for which the mesh diameter is less than or equal to 1,000 µm,
(b) dry blending of the sieved composition,
(c) deposition of the blended composition in a mold, this mold being preferably pre-heated,
(d) molding by thermocompression the blended composition by induction heating of the mold, and
(e) removal from the mold of the thermocompressed composition leading to obtaining of the composite bipolar plate.

For the advantageous characteristics of the method giving the possibility of manufacturing said composite bipolar plate, reference will be made to what was defined earlier.

The invention thirdly relates to the use of a composite bipolar plate as defined above.

According to the invention, this composite bipolar plate may be advantageously used in a fuel cell.

This fuel cell may in particular be a polymeric electrolyte membrane fuel cell (PEMFC) and notably a direct methanol fuel cell (DMFC).

Fourthly, the invention relates to a fuel cell comprising at least one composite bipolar plate as defined above.

According to the invention, this fuel cell may in particular be a polymeric electrolyte membrane fuel cell (PEMFC) and notably a direct methanol fuel cell (DMFC).

Other features and advantages of the invention will be better apparent upon reading the additional description which follows, which relates to particular embodiments of the invention.

It is specified that this additional description, which notably refers to FIGS. 1 to 4 as appended, is only given as an illustration of the object of the invention and by no means is a limitation of this object.

In particular, the method for manufacturing a composite bipolar plate which is detailed hereafter is of course transposable to the manufacturing of a composite bipolar plate which would be obtained from a composition comprising at least one lamellar graphite as defined above and at least one thermosetting polymer instead of a thermoplastic polymer.

DETAILED DISCUSSION OF PARTICULAR EMBODIMENTS

—I— Compounds Used

Within the scope of the present example, the following compounds were used:
- the lamellar graphites are synthetic lamellar graphites so-called « primary synthetic graphites », marketed by Timcal under references Timrex® KS 75 and Timrex® KS 150, for which at least 90% of the particles in number have an average particles size, noted as $d_{90}$, of 55.8 μm for Timrex® KS 75 (noted as KS 75 hereafter) and of 180 μm for Timrex® KS 150 (noted KS 150 hereafter),
- the additive is an expanded graphite, marketed by Timcal under reference Timrex® BNB90 (noted as BNB90 hereafter), which has an average particles size $d_{90}$ of 85 μm, and
- the thermoplastic polymer is a polyvinylidene fluoride, marketed by Arkema under reference Kynar®301-F (noted as PVDF hereafter), which is characterized by a viscosity in the molten condition comprised between 28.0 kP and 34.0 kP at a temperature of 232° C. and under a shearing rate of 100/s (measured according to the ASTM D3835 standard), with a hot fluidity index comprised between 2.0 g/10 min and 6.0 g/10 min at a temperature of 232° C. and under a load of 21.6 kg (measured according to the ASTM D1238 standard) as well as with a melting point comprised between 155° C. and 165° C., this polymer further appearing as a powder for which the particles size $d_{90}$ is of about 5.0 μm.

—II— Preparation of the Compositions and then of the Blended Compositions

Compositions 1 to 12 were prepared from compounds described in chapter —I—, in mass proportions indicated in Tables 1 and 2 below:

TABLE 1

| Composition | 1 | 2 | 3 | 4 | 5 | 6 | 7 |
|---|---|---|---|---|---|---|---|
| PVDF (in %) | 15 | 15 | 10 | 10 | 14 | 14 | 14 |
| KS 75 (in %) | 85 | — | 90 | — | — | — | — |
| KS 150 (in %) | — | 85 | — | 90 | 84 | 82.5 | 81 |
| BNB90 (in %) | — | — | — | — | 2 | 3.5 | 5 |

TABLE 2

| | Composition | | | | |
|---|---|---|---|---|---|
| | 8 | 9 | 10 | 11 | 12 |
| PVDF (in %) | 15 | 14 | 13 | 12 | 10 |
| KS 150 (in %) | 80 | 81 | 82 | 83 | 85 |
| BNB90 (in %) | 5 | 5 | 5 | 5 | 5 |

The blended compositions obtained from the compositions 1 to 12 as detailed in Tables 1 and 2 above were prepared according to a same procedure which is described hereafter, with reference to the preparation of the blended composition 6.

To produce 10 kg of the blended composition 6, the following amounts of compounds were weighed:
- 8,250 g (±0.5 g) of KS 150,
- 350 g (±0.5 g) of BNB90, and
- 1,450 g (±0.5 g) of PVDF.

After manual pre-blending for a period of 1 min of the amounts mentioned above, it was proceeded with dry sieving of the composition 6 by means of an automatic sieve Ro-Tap® RX 29-10 available from Tyler. This automatic sieve is equipped with a sieve having a mesh diameter of 300 μm as well as with a unclogging device. This dry sieving step lasted for 45 min.

After the dry sieving step, it was proceeded with dry blending of the sieved composition 6 by means of a blender Turbula® T50 A available from Wab, the dry blending step being conducted under a speed of rotation of 40 revolutions/minute, for a period of 20 mins. It is specified that this duration of 20 mins gives the possibility of giving an optimum dispersion of the three compounds in the corresponding blended composition 6 thus obtained, notably as compared with a shorter duration which would be of 10 min for a same obtained amount of blending composition (in this case, 10 kg).

At the end of this dry blending step, a blended composition 6 was obtained appearing as a homogenous dry blend, this homogeneity being observable at a sub-millimeter scale as defined above.

—III— Manufacturing of Composite Bipolar Plates from the Compositions

The composite bipolar plates made from the compositions 1 to 5 and 7 to 12 were manufactured according to an identical manufacturing cycle with the one which is described hereafter for the manufacturing of a composite bipolar plate from composition 6.

Figure 1:
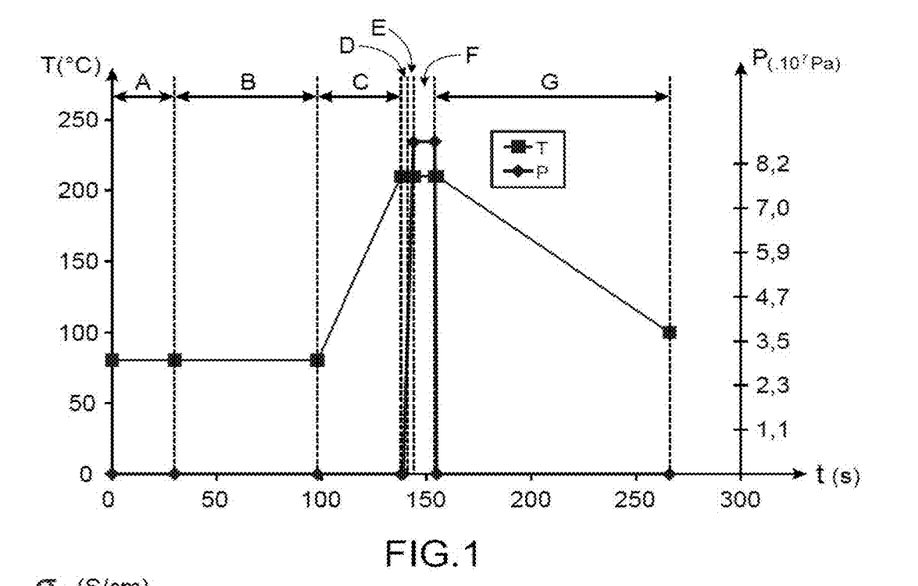
FIG. 1 illustrates the curves expressing the time-dependent change in the temperature (noted as T and expressed in ° C.) and in the pressure (noted as P and expressed in Pa) depending on time (noted as t and expressed in s), during phases A to G of the manufacturing cycle of a composite bipolar plate from the composition 6, subject beforehand to dry sieving and then to dry blending.

The various phases A to G of the manufacturing cycle are described in detail hereafter, with reference to FIG. 1. FIG. 1 moreover illustrates the time-dependent change in the temperature and in the applied pressure versus time.

The blended composition 6, as obtained at the end of the dry sieving and then dry blending steps, is deposited in the imprint of a mold brought beforehand to a temperature of 80° C. by means of induction heating. This deposition phase corresponds to the phase A illustrated in FIG. 1.

During the manufacturing cycle described here, the deposition of an amount weighed beforehand of the blended composition 6 in the mold was carried out manually.

During phase B, it is preceded with the spreading of the blended composition 6 so as to obtain a regular distribution of this composition in the cavity of the mold.

The mold is then closed and brought, within 40 s, to a temperature of 210° C., i.e. at a temperature 55° C. above the melting temperature of PVDF. This rise in temperature of the mold, which corresponds to phase C of FIG. 1, is carried out as rapidly as possible facing the configuration of the inductors, the shape of the composite bipolar plate to be manufactured and the power of the generators.

It is specified that the temperature applied to the mold should remain compatible with the maximum admissible temperature which may be imposed by a surface treatment, such as an anti-adherent treatment, practiced at the imprint of the mold. In the case of the mold used during the present manufacturing cycle, the maximum admissible temperature is 220° C.

During phase D, which follows phase C, an isothermal plateau is achieved with a duration of 1 s at 210° C. before applying pressure to the mold as well as to the composition 6 which it contains, which corresponds to phase E.

During phase E, it is preceded with a gradual rise in the applied pressure up to a rated applied pressure value of $9.4.10^7$ Pa, the temperature being still maintained at 210° C. This gradual rise is achieved within 5 s, by increasing the applied pressure at a rate of 300 kN/s.

During phase F, which follows phase E, an isothermal and isobaric plateau is achieved with a duration of 10 s at 210° C. and under the rated pressure value of $9.4.10^7$ Pa.

At the end of phase F, which is located at a time of 150 s after the beginning of phase A for depositing the blended composition 6 into the cavity of the mold, the applied pressure is released and the temperature of the mold is lowered down to a value of 100° C., a temperature at which the obtained composite bipolar plate from the blended composition 6 is extracted from the mold, for example by ejection. This phase G, which begins with the release of the applied pressure and ends with the extraction of the composite bipolar plate, corresponds to the cooling step for the mold and to a duration of about 110 s.

It should be noted that for the composite bipolar plates manufactured from the compositions 1 to 12, it is necessary to lower the temperature of the mold until a value of 100° C. is attained, at most, for allowing extraction of the composite bipolar plates without deformation of these plates, in particular when it is proceeded with this extraction by ejection.

It is observed that the manufacturing cycle, formed by the successive phases A to G, is achieved within a duration of less than 5 min, it being specified that the overall time of the manufacturing method taking into account the pre-blending, dry sieving and dry blending steps of the composition is established to less than 75 min.

—IV— Evaluation of the Planar Electric Conductivity

The evaluation of the planar electric conductivity was carried out by the 4-point method by applying the semi-infinite model, the thickness being considered as infinite relatively to the spacing of the tips. The planar electric conductivity, noted as $\sigma_{//}$ and expressed in S/cm, is inferred from the following formula:

$$\sigma_{//} = \frac{I}{2\pi s U}$$

wherein I is the intensity
s is the spacing between the tips, and
U is the voltage.

For evaluating this planar electric conductivity, composite bipolar plates were manufactured, according to the manufacturing cycle described earlier in chapter —III—, from the compositions 1 to 7 prepared according to the procedure described in chapter —II— above.

Figure 2:
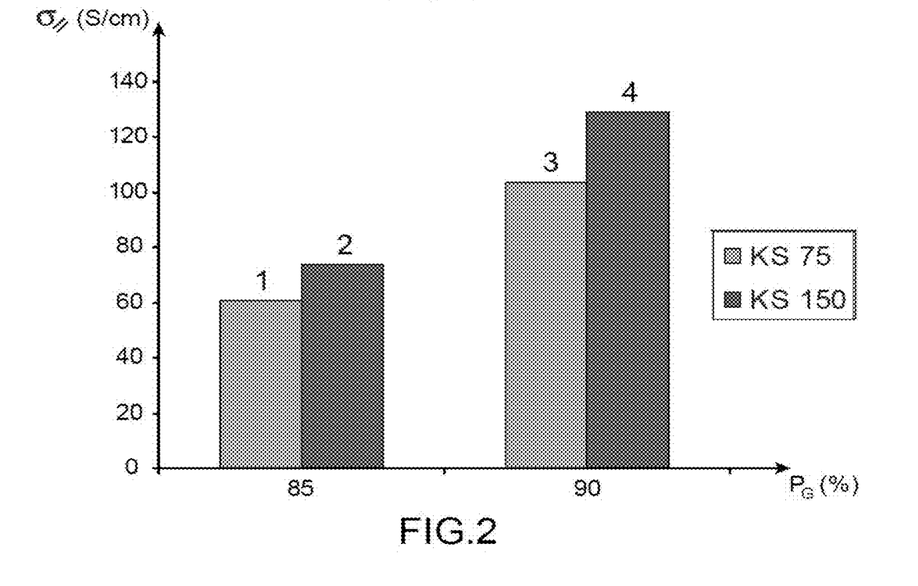
FIG. 2 illustrates the time-dependent change in the planar electric conductivity (noted as $\sigma_{//}$ and expressed in S/cm) of bipolar plates manufactured from compositions 1 to 4, depending on the mass percentage of lamellar graphite (noted as $P_G$ and expressed in %) present in said compositions 1 to 4.

FIG. 2 illustrates the time-dependent change in the planar electric conductivity, noted as $\sigma_{//}$, of the composite bipolar plates manufactured from the compositions 1 to 4, depending on the mass percentage of lamellar graphite present in said compositions 1 to 4.

In addition to confirming the expected increase in the planar electric conductivity of the composite bipolar plates with the mass percentage of lamellar graphite, the bar diagrams of FIG. 2 show that, for a same mass percentage of lamellar graphite, better planar electric conductivity is obtained for the composite bipolar plates manufactured from the compositions 2 and 4 comprising the lamellar graphite Timrex® KS 150 than for the composite bipolar plates manufactured from the compositions 1 and 3 which comprise the lamellar graphite Timrex® KS 75.

FIG. 3 illustrates the time-dependent change in the planar electric conductivity $\sigma_{//}$ of the composite bipolar plates manufactured from the compositions 5 to 7, depending on the mass percentage of expanded graphite present in said compositions 5 to 7. It is specified that these compositions 5 to 7 all comprise a total mass percentage of 86% of a mixture of lamellar graphite (Timrex® KS 150) and of expanded graphite (Timrex® BNB90), with variable respective percentages of lamellar graphite and of expanded graphite, as indicated in table 1 above.

The observation of the curve of FIG. 3 shows values of planar electric conductivity for the composite bipolar plates manufactured from the compositions 5 to 7 which range between 77 S/cm and 84 S/cm, such values being greater than the value of 74 S/cm which is obtained for the planar electric conductivity of the composite bipolar plate manufactured from composition 2 which only comprises lamellar graphite Timrex® KS 150, in a comparable mass percentage of 85%.

This comparison shows the fact that by substitution of expanded graphite for lamellar graphite, even in a reduced mass percentage, and notably comprised between 2% and 5% based on the total mass of the composition, it is possible to optimize the planar electric conductivity properties. Indeed, the presence of expanded graphite promotes the formation of electrically conducting bridges within the composite bipolar plates manufactured from compositions comprising such an additive.

FIG. 3 moreover shows that the maximum planar electric conductivity value is attained for a mass percentage of 3.5% of expanded graphite. In other words, by a substitution of the order of 3.5% by mass of the lamellar graphite with expanded graphite it is possible to manufacture a composite bipolar plate having optimized electric conductivity properties, in particular of planar electric conductivity.

—V— Evaluation of the Planar Electric Conductivity and of the Sealing Properties The evaluation of the planar electric conductivity was achieved according to the method specified in Chapter —IV— above.

The gas imperviousness properties were evaluated by means of a sealed cell in which each plate was inserted, so as to define two chambers, an upstream chamber and a downstream chamber. By means of a manometer, a pressure of $10^5$ Pa of dinitrogen $N_2$ is applied in the upstream chamber and then the time-dependent change in the difference of the respective pressures of the upstream and downstream chambers is tracked. It is considered that a plate is impervious, i.e. that it does not have any network of open porosities, when this difference of respective pressures of the upstream and downstream chambers is less than or equal to $10^3$ Pa. Beyond this threshold value, the plate is rejected. A rejection level is thus determined which corresponds to the number of non-impervious plates based on the total number of tested plates, it being specified that for each composition 8 to 12, a total number of 20 plates was subject to the present imperviousness test.

For evaluating the planar electric conductivity as well as the gas imperviousness properties, composite bipolar plates were manufactured according to the manufacturing cycle described earlier in chapter —III—, from compositions 8 to 12, prepared according to the procedure described in chapter —II— above.

Figure 4:
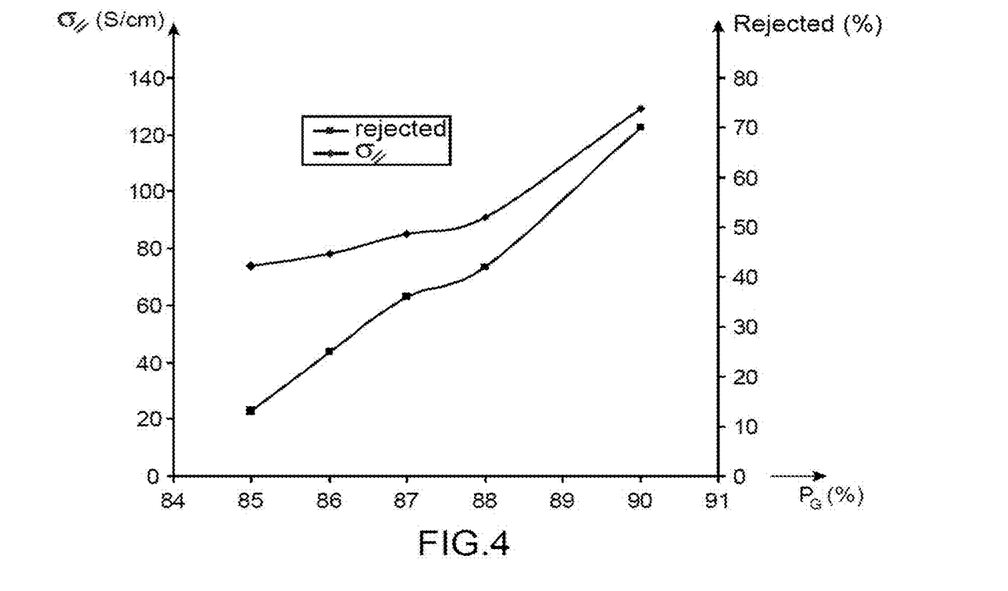
FIG. 4 illustrates the time-dependent change in the planar electric conductivity (noted as $\sigma_{//}$ and expressed in S/cm) and of the rejection level to the gas imperviousness test (noted as Rejected and expressed in %) of the composite bipolar plates manufactured from compositions 8 to 12, depending on the mass percentage of lamellar graphite (noted as $P_G$ and expressed in %) present in said compositions 8 to 12.

FIG. 4 illustrates the time-dependent change in the planar electric conductivity, noted as $\sigma_{//}$, as well as the rejection level to the gas imperviousness test, noted as Rejected, of the composite bipolar plates manufactured from the compositions 8 to 12, depending on the mass percentage of lamellar graphite present in said compositions 8 to 12.

As already observed above for FIG. 2, FIG. 4 shows that the planar electric conductivity of the composite bipolar plates gradually increases with the mass percentage of lamellar graphite. On the other hand, it is observed that the rejection level to the gas imperviousness test also increases gradually according to this same mass percentage of lamellar graphite. In other words, if the increase in the mass percentage of lamellar graphite and of expanded graphite gives the possibility of improving the planar electric conductivity, this increase is accomplished to the detriment of the gas imperviousness properties of the composite bipolar plate.

Therefore, it appears necessary to limit the mass percentage of lamellar graphite and, if necessary, of electrically conductive additive(s) like expanded graphite, in order to meet the whole of the specifications of the requirements, notably those imposed by the planar electric conductivity and for the rejection level to the gas imperviousness test for which a maximum value of 5% is conventionally retained.

The inventors were thus able to show, that from the compounds listed in chapter —I—, a composition comprising mass percentages of 14% of PVDF and of 86% of lamellar graphite Timrex® KS150 alone, or for which a mass percentage ranging up to 10% may be substituted with expanded graphite Timrex® BNB90, gives the possibility of manufacturing composite bipolar plates which simultaneously meet the planar electric conductivity specifications and of the rejection level to the gas imperviousness test conventionally set by the requirements.

—VI— Optimization of the Parameters of the Manufacturing Cycle

Tests were conducted for determining which are the parameters of the manufacturing cycle which allow optimization of the planar electric conductivity and of the rejection level to the gas imperviousness test of a composition according to the invention.

The parameters (a) to (g) evaluated during these tests are the following:

(a) the temperature for pre-heating the mold as established before starting the manufacturing cycle and the deposition of the composition into the imprint of the mold, (b) the temperature for removal from the mold which corresponds to the temperature attained by the mold during the extraction of the composite bipolar plate and which corresponds to the term of phase G, (c) the temperature of the isothermal plateau of phase D, (d) the duration of this isothermal plateau of phase D, (e) the rate of the increase in the applied pressure during phase E, (f) the duration of the isothermal and isobaric plateau of phase F, and (g) the applied rated pressure at the term of phase E and during phase F.

These evaluations showed the fact that the parameters of the pre-heating temperature conducted at 80° C. and at 100° C. (a), of the mold-removal temperature conducted at 80° C. and at 100° C. (b) and of the rate of increase in the applied pressure (e) does not have any actual influence, whether this is on the planar electric conductivity values or on the rejection level values to the gas imperviousness test of the composite bipolar plates manufactured from composition 6.

On the contrary, as shown by the results reported in Table 3 below, the parameters which are the isothermal plateau temperature of phase D (c), the duration of this isothermal plateau of phase D (d), the duration of the isothermal and isobaric plateau of phase F (f) as well as the rated pressure applied at the term of phase E and during phase F (g) have an impact on these planar electric conductivity values (noted as $\sigma_{//}$) and on the rejected level to the gas imperviousness test.

TABLE 3

| Parameter (c) Temperature of the isothermal plateau phase D (° C.) | Parameter (d) Duration of the isothermal plateau phase D (s) | Parameter (f) Duration of the isobaric and isothermal plateau phase F (s) | Parameter (g) Applied rated pressure phase F (Pa) | $\sigma_{//}$ (S/cm) | Rejection (%) |
|---|---|---|---|---|---|
| 210 | 30 | 60 | $9 \cdot 10^7$ | 95 | 10 |
| 190 | 30 | 60 | $9 \cdot 10^7$ | 73 | 0 |
| 210 | 10 | 60 | $9 \cdot 10^7$ | 85 | 0 |
| 190 | 10 | 60 | $9 \cdot 10^7$ | 87 | 0 |
| 210 | 30 | 10 | $9 \cdot 10^7$ | 88 | 40 |
| 190 | 30 | 10 | $9 \cdot 10^7$ | 83 | 0 |
| 210 | 10 | 10 | $9 \cdot 10^7$ | 97 | 0 |
| 190 | 10 | 10 | $9 \cdot 10^7$ | 82 | 0 |
| 210 | 30 | 60 | $7.5 \cdot 10^7$ | 89 | 10 |
| 190 | 30 | 60 | $7.5 \cdot 10^7$ | 80 | 40 |
| 210 | 10 | 60 | $7.5 \cdot 10^7$ | 93 | 0 |
| 190 | 10 | 60 | $7.5 \cdot 10^7$ | 86 | 0 |
| 210 | 30 | 10 | $7.5 \cdot 10^7$ | 100 | 0 |
| 190 | 30 | 10 | $7.5 \cdot 10^7$ | 80 | 30 |
| 210 | 10 | 10 | $7.5 \cdot 10^7$ | 97 | 30 |
| 190 | 10 | 10 | $7.5 \cdot 10^7$ | 80 | 30 |

Table 3 shows that the planar electric conductivity of the composite bipolar plates manufactured from the composition 6 is, quasi systematically, much higher when the temperature of the isothermal plateau applied during the phase D (c) is of 210° C. rather than 190° C., i.e. when this temperature is itself a high temperature.

The other parameters (d), (f) and (g), as for them, have a less pronounced impact on the planar electric conductivity values. However, Table 3 shows, that in order that the rejection level to the gas imperviousness test be lower, these parameters are, by order of decreasing importance:

an applied rated pressure (g) during phase F of $9.10^7$ Pa rather than $7.5.10^7$ Pa, i.e. higher, a isothermal plateau duration (d) during phase D, of 10 s rather than 30 s, i.e. shorter, and an isothermal and isobaric plateau duration (f) during phase F, of 60 s rather than 10 s, i.e. longer.

In order to take into account the specifications of the requirements as well as the more demanding productivity constraints, with the composition 6, the optimal operating conditions are:

an isothermal plateau temperature (c) during phase D of 210° C., an applied rated pressure (g) during phase F of $9.10^7$ Pa, an isothermal plateau duration (d) during phase D, of 10 s, and an isothermal and isobaric plateau duration (f) during phase F, of 10 s.

BIBLIOGRAPHY

[1] U.S. Pat. No. 7,494,740

The invention claimed is:

1. A method for manufacturing a composite bipolar plate from a composition comprising at least one lamellar graphite and at least one thermoplastic polymer, said method comprising the following successive steps:
($a_0$) forming a composition comprising the at least one lamellar graphite and the at least one thermoplastic polymer,
(a) dry sieving of the composition with a sieve for which the mesh diameter is less than or equal to 1,000 µm,
(b) dry blending of the sieved composition,
(c) deposition of the blended composition in a mold,
(d) molding by thermocompression of the blended composition with induction heating of the mold, and
(e) removal from the mold of the thermocompressed composition leading to obtaining of the composite bipolar plate.

2. The manufacturing method according to claim 1, wherein the mesh diameter of the sieve is comprised between 100 µm and 600 µm.

3. The manufacturing method according to claim 1, wherein step (d) is carried out by applying a pressure comprised between $5 \cdot 10^7$ Pa and $15 \cdot 10^7$ Pa, the mold being heated to a temperature above the melting temperature of the thermoplastic polymer.

4. The manufacturing method according to claim 1, wherein the composition comprises, the mass percentages being based on the total mass of the composition:
at least 70% of said at least one lamellar graphite, and
at least 10% of said at least one thermoplastic polymer.

5. The method according to claim 4, wherein the mass percentage of lamellar graphite(s) is comprised between 75% and 90%, based on the total mass of the composition.

6. The method according to claim 4, wherein the mass percentage of thermoplastic polymer(s) is comprised between 11% and 25%, based on the total mass of the composition.

7. The method according to claim 1, wherein each lamellar graphite appears as particles for which at least 90% in number have an average particles size $d_{90}$ comprised between 1 µm and 300 µm.

8. The method according to claim 1, wherein each thermoplastic polymer is selected from a polyolefin, a fluoropolymer and a poly(phenylene sulfide) (PPS).

9. The method according to claim 8, wherein the fluoropolymer is a polyvinylidene fluoride (PVDF) or a poly (vinylidene fluoride-hexafluoropropylene) (PVDF HFP).

10. The method according to claim 1, wherein each thermoplastic polymer appears as particles for which at least 90% in number have an average particles size $d_{90}$ comprised between 1 µm and 200 µm.

11. The method according to claim 1, wherein each lamellar graphite and each thermoplastic polymer appear as particles for which at least 90% in number have an average particles size $d_{90}$ comprised in the same interval.

12. The method according to claim 1, wherein the composition further comprises at least one non-metal electrically conductive additive.

13. The method according to claim 12, wherein each additive is selected from among an expanded graphite, a lamellar graphite, carbon black, active coal, carbon fibers, carbon nanotubes and mixtures thereof and is.

14. The method according to claim 12, wherein the mass percentage of additive(s) represent up to 10% of the total mass of the composition, is comprised between 2% and 5% based on the total mass of the composition.

15. A composite bipolar plate obtained by the method according to claim 1.

16. A fuel cell comprising at least one composite bipolar plate according to claim 15.

17. The manufacturing method according to claim 1, wherein said mold is pre-heated.

18. The method according to claim 10, wherein each thermoplastic polymer appears as particles for which at least 90% in number have an average particles size $d_{90}$ comprised between 2 µm and 100 µm.

19. The method according to claim 10, wherein each thermoplastic polymer appears as particles for which at least 90% in number have an average particles size $d_{90}$ comprised between 3 µm and 50 µm.

20. The method according to claim 11, wherein each lamellar graphite and each thermoplastic polymer appear as particles for which at least 90% in number have an average particles size $d_{90}$ comprised between 1 µm and 300 µm.

21. A fuel cell according to claim 16, said fuel cell being a polymeric electrolyte membrane fuel cell (PEMFC).

22. A fuel cell according to claim 16, said fuel cell being a direct methanol fuel cell (DMFC).

* * * * *